(12) United States Patent
Grawe et al.

(10) Patent No.: US 9,095,783 B2
(45) Date of Patent: Aug. 4, 2015

(54) ARRANGEMENT AND METHOD FOR PRODUCING HIGH-PURITY CRYSTALS

(75) Inventors: Detlef Grawe, Kleinromstedt (DE); Robert Eilers, Jena (DE); Sabine Gliesing, Jena (DE)

(73) Assignee: HAPILA GmbH, Gera (DE)

( * ) Notice: Subject to any disclaimer, the term of this patent is extended or adjusted under 35 U.S.C. 154(b) by 1294 days.

(21) Appl. No.: 12/992,861

(22) PCT Filed: Apr. 29, 2009

(86) PCT No.: PCT/DE2009/000603
§ 371 (c)(1),
(2), (4) Date: Nov. 15, 2010

(87) PCT Pub. No.: WO2009/138055
PCT Pub. Date: Nov. 19, 2009

(65) Prior Publication Data
US 2011/0065952 A1    Mar. 17, 2011

(30) Foreign Application Priority Data
May 14, 2008    (DE) .......................... 10 2008 023 833

(51) Int. Cl.
*B01D 9/02*    (2006.01)
*B01D 9/00*    (2006.01)

(52) U.S. Cl.
CPC ................................... *B01D 9/0022* (2013.01)

(58) Field of Classification Search
USPC ....................................... 422/245.1, 249, 250
See application file for complete search history.

(56) References Cited

U.S. PATENT DOCUMENTS

| 2,579,421 | A | 12/1951 | Egan |
| 3,154,395 | A | 10/1964 | Stine et al. |
| 4,279,130 | A | 7/1981 | Finch et al. |
| 4,787,985 | A | 11/1988 | Roodenrijs et al. |
| 4,806,318 | A | 2/1989 | Saitoh et al. |
| 5,127,921 | A | 7/1992 | Griffiths |
| 5,466,266 | A | 11/1995 | Griffiths |
| 5,505,924 | A | 4/1996 | Johnson |
| 6,145,340 | A | 11/2000 | Stepanski et al. |
| 6,689,903 | B2 | 2/2004 | O'Meadhra et al. |
| 7,270,752 | B2 | 9/2007 | Carvin et al. |

FOREIGN PATENT DOCUMENTS

| DE | 32 39 244 | 4/1984 |
| DE | 195 36 859 | 4/1997 |

(Continued)

OTHER PUBLICATIONS

"Schmelzkristallisation—theoretische Voraussetzungen and technische Grenzen"; George Wellinghoff, et al. Chem.-Ing.-Tech. 63(1991), Nr. 9, pp. 881-889.

(Continued)

*Primary Examiner* — Robert M Kunemund
(74) *Attorney, Agent, or Firm* — Jordan and Hamburg LLP

(57) ABSTRACT

An arrangement and a method for producing high-purity crystals, such as temperature-sensitive pharmaceutical agents, in a countercurrent crystallization process. The arrangement comprises a plurality of crystallizers, mother liquor lines, each of which has a shut-off valve, and crystallization product lines, each of which has a shut-off valve, so that a mother liquor flow can be generated which is directed from a crystallizer to the second-next crystallizer in the direction of decreasing purity, and a crystallization product flow can be generated which is directed from a to dissolved crystallization product that is about to crystallize to the next crystallizer in the direction of higher purity.

21 Claims, 2 Drawing Sheets

(56) References Cited

FOREIGN PATENT DOCUMENTS

| | | |
|---|---|---|
| DE | 199 24 533 | 11/2000 |
| DE | 600 10 753 | 9/2004 |
| DE | 602 07 852 | 7/2006 |
| EP | 0 242 181 | 10/1987 |
| EP | 0 891 798 | 1/1999 |

OTHER PUBLICATIONS

"Fraktionierte Kristallisation"; Gustaf Matz, Chem.-Ing.-Tech. 52 (1980), Nr. 7, pp. 562-570.

ARRANGEMENT AND METHOD FOR PRODUCING HIGH-PURITY CRYSTALS

BACKGROUND OF THE INVENTION

The present invention relates to an arrangement and to a method for producing high-purity crystals such as temperature-sensitive pharmaceutical agents, in a countercurrent crystallization process.

Arrangements of the type of the invention are provided with crystallizers operated in a column-like manner in countercurrent principle so that for substances contained in mother liquors a separation effect is produced that allows the purification of said substances.

The purification of substances by crystallization has been known for many years. Up to now, the purification of substances, particularly of pharmaceutical agents, is still one of the most effective purification methods. If a very high degree of final purities (>99.99%) is required, the conventional crystallization rapidly comes to its limits. In practice, a complex impurity profile with 5 to 10 by-products is often obtained. The by-products can be principally depleted in the target product by crystallization but they have very different depletion properties. A high final purity cannot be reached in one crystallization stage but in a crystallization method that consists of several stages and fractions. The purity is inversely proportional to the yield obtained. Therefore, the required time increases and the yield losses even grow exponentially with the number of stages. For example, after a fivefold recrystallization the total yield is only 17% to 70% per stage. The major part of the substance is contained in mother liquors. A complex fractionation process is the only way to bring a portion of it to the desired degree of final purity.

In the field of distillation and extraction a continuous fractionation and unification of the phases in countercurrent principle makes it possible to multiply the fractioning effects based on the distribution equilibration and thus to develop very efficient fractionation processes. In practice, rectification or extraction columns or Mixer-Settler-systems are used as equipment for these processes.

Principally, such an idea can also be transferred to crystallization because also here the fractioning effect (purification effect) is based on the different distribution of the individual impurities between the crystallization product and mother liquid phases. However, the technological implementation of the multiplicative fractionation effect analogous to extraction/rectification is difficult because the phase transitions are solid-liquid-transfers.

There is a number of publications about the classical process management in column-like equipments (DE 32 39 244 A1, EP 0242 18 A1, U.S. Pat. No. 3,154,395, U.S. Pat. No. 4,279,130). These processes are complex and susceptible to faults; the apparatus belonging to them are complicated and tailored to the relevant crystallization problem. Frequently they have only low bottom efficiency due to difficult substance transfer conditions (G. Matz, "Fraktionierte Kristallisation" (Fractionated crystallization), Chemie-Ingenieur-Technik, 52, (1980), no. 7, p. 562-570). Unlike rectification or extraction columns they could not be established as standard methods in industrial practice.

The alternative to the classical continuous process management in column-like arrangements is a multi-stage process in separated, technologically similar crystallization units. It can also be performed as a more or less continuous procedure.

A number of procedures and systems for the fractionated, multi-stage crystallization is known (see, for example, U.S. Pat. No. 4,787,985, U.S. Pat. No. 5,127,921). According to these disclosures the yield losses in multiple crystallizations are reduced by a countercurrent flow of mother liquor and crystallization product. Moreover, the purification effect per stage can be increased by a partial reflow of the crystallization product and mother liquor in each stage. But this will of course reduce the throughput.

Disadvantages of the methods and arrangements known so far are the complex equipment and procedures required. A large number of basic process operations that can be separately performed with individual apparatus are connected with each other in quantity flow according to prior art.

In U.S. Pat. No. 5,127,921, for example, a crystallizer, a dissolution vessel, an external solid-liquid-separation unit and diverse buffer vessels for mother liquor and crystallization product are required for each crystallization stage. Moreover, pumps for the transport of the solution and systems for the reflux separation are required and distillation recipients must be additionally provided for the possible evaporation of the solution.

This lack of technological compactness inevitably leads to a complex connection of the sections of the arrangement and, in the event of a high stage number, to a complicated equipment layout. Consequently, the automation for maintaining a stationary countercurrent regime and the control for synchronizing all stages are also very problematic, particularly as external solid-liquid separators (centrifuges, filters, etc.) and solid substance transports between separators and dissolution vessels are required that can be very complex in view of the texture of the crystalline material (grain size).

The separation of the equipment of the dissolution process and of crystallization is disadvantageous, too, because hardly solvable crusts can be produced on the cooling surfaces of the crystallizer. According to this procedure, the crystallization is achieved by cooling a solution that is as saturated as possible. Therefore, the yield is mainly determined by the temperature gradient of the solubility. From an economic point of view, this means that the yield scope is considerably restricted despite the countercurrent principle. A lot of substances, particularly pharmaceutical agents, do not have a sufficient solubility gradient to obtain economic yields with reasonable energetic efforts.

An additional evaporation could be possible, although not described, but it requires further equipment as well as technological and logistic efforts in addition to the already expensive technical apparatus.

U.S. Pat. No. 4,787,985 also discloses a countercurrent crystallization process for purifying chemical substances by means of a plurality of repeating, identical technological stages. But also here, several basic technical operations with separated equipment are connected per stage: crystallizer, recrystallizer, filter system, separator, thickening unit and/or wash columns and pumps. A completely continuous process is described that, as in the other examples, is only suitable for crystallizations from the melt and not from solvents.

U.S. Pat. No. 5,505,924 also describes a multi-stage countercurrent flow process with the appropriate equipment. Within the u-shaped crystallization units heating and cooling zones are arranged for the locally separated dissolution and recrystallization processes. The transport to the next crystallization unit is realized in form of a solid via perforated containers that absorb the crystallization product. The mother liquor is separated by dripping it off or washing after its removal from the cooling zone. Then, these crystallization containers are brought into the heating zone of the next crystallization unit via an automated transport technology system for being dissolved. This open transport technology is only suitable for aqueous solutions. Moreover, the transfer of the crystallization product is not complete. Also here, the described procedure can only be applied if the solubility has a sufficiently high temperature dependency. The yield exclusively depends on the temperature difference between the heating and the cooling zone. As already mentioned above, in many cases this is not sufficient for obtaining economic yields.

A further disadvantage of the described published procedures is the transport of the required heat via cooling areas to maintain the supersaturation condition of the solution during the crystallization. During longer process periods this method can cause hardly solvable deposits that can have a negative influence on the stability in the stationary operation.

The methods and arrangements of the state of the art are not suitable for crystallization products that do not crystallize in suspension but tend to deposit on apparatus surfaces.

Depending on the crystallization properties, fine grain particles can additionally impede an external filtration and washing.

Further process technologies and apparatus for multi-stage fractionated crystallizations have been developed so far, particularly in the field of melt crystallization (for example, see EP 0891 798 A1 and G. Wellinghoff, K. Wintermantel, "Schmelzkristallisation theoretische Voraussetzungen and technische Grenzen" (Melt crystallization theoretical conditions and technical limits), Chemie-Ingenieur-Technik no. 9, p. 881-891). These methods are mainly based on the formation of crystal layers on metal surfaces thus allowing a technologically simple separation of the mother liquor and crystallization product. But due to the thermal sensitivity of many pharmaceutical agents at the melting point these processes are normally not suitable for their purification.

DE 602 07 852 A1 discloses a crystallization method in which several crystallizers are simultaneously operated in a continuous manner (not batch by batch) in co-current (not countercurrent). In the crystallization stages, different evaporation rates of a suspension are achieved and a complete dissolution and crystallization do not happen per stage as it is normal for the multi-stage, fractionated crystallization. From the point of purification crystallization it is a one-stage process. The evaporation heat is provided by a gradual expansion and thus cooling of the suspension from overpressure to the normal pressure level. Distillate can be led back for dilution and thus for controlling the purification.

In the procedure according to DE 602 07 852 A1 the recovery of crystalline terephthalic acid, which contains less than 150 parts per million on weight (ppmw) of p-toluic acid referred to the weight of the terephthalic acid, is performed in four steps:

In the first step, a solution of terephthalic acid and p-toluic acid are subject to a temperature ranging from 260 to 320° C. and a defined pressure that is sufficiently high to keep the solvent in the liquid phase.

In the second step the solution of the first step is supplied to a crystallization zone that comprises a plurality of series-connected crystallizers in which the solution is subject to a speed-determined evaporation cooling by the sequential reduction of pressure and temperature to achieve the crystallization of terephthalic acid. At the end of the crystallization zone the pressure of the solution corresponds to ambient pressure or less.

In the third step the solvents evaporated from the crystallizers condense and the condensed solvent is led back into the crystallization zone at a point that follows the crystallizer from which it was obtained.

In the fourth and last step of the process solid, crystalline terephthalic acid is obtained by the liquid-solid-liquid separation at ambient pressure.

SUMMARY OF THE INVENTION

Thus, the present invention is directed to a design for an arrangement and devise of a method for producing high-purity crystals, particularly temperature-sensitive pharmaceutical agents, in a countercurrent crystallization process.

The present invention contemplates and provides the following aspects:
  providing a countercurrent-based multi-stage crystallization technology that allows obtaining a very good yield of a high-purity crystal with less manual operating effort and a high reliability and reproducibility,
  providing a compact arrangement solution in which the dissolving, crystallizing, phase-separating operations can be carried out without physical and equipment separation but within one crystallizer (standard apparatus, preferably heatable stirred reactor) without complicated peripheral equipment,
  allowing a phase separation and substance transports in a technologically simple manner for realizing the countercurrent between the crystallization stages,
  indicating an arrangement solution that includes parallel-operated stages in which a high degree of compliance and reproducibility of the purification effect and yield can be achieved,
  allowing a stage yield that can be set in broad areas independently of the temperature dependency of the solubility,
  ensuring crystallization phases in which the crystal growth is supported and germ formation is impeded and thus both a high purification effect and a good phase separation are made possible,
  providing an automated technology that can be adjusted to the purification task,
  avoiding interferences in the course of the process caused by crystalline depositions on crystallizer components during the crystallization phase,
and ensuring the realization of a stationary, quasi-continuous operation during the whole process.

The inventive method and inventive arrangement of the present invention are directed to the production of high-purity crystals by their multi-stage crystallization from solutions. In the batch-by-batch operated crystallization stages according to the invention the crystallization product and mother liquor are led in countercurrent without an external separation of the crystallization product. All transports between the crystallizers are performed in a sequential manner and only in form of solutions. But the dissolution and crystallization processes in the crystallizers are carried out in parallel and, in terms of the process conditions, synchronous in time. Thus, high process efficiency is achieved. The supersaturation course during the crystallization is set identically for all crystallizers by alternating heating and evaporation phases in vacuum with a vacuum profile that is adjusted to the particularities of the material. The temperature oscillation profiles support the crystal growth and the depletion of impurities. In this way, a high reproducibility and compliance in terms of yield and purification effects is achieved for all crystallization stages. A compact, mostly automated arrangement that is well adjusted to the purification problem enables obtaining a very good yield of a high-purity crystallization product with low operation efforts in a quasi-continuous process.

According to the invention, said production of high purity crystals is realized by the following procedures in which:

the same amount of solvent, proportional to the quantity used, continuously evaporates from all crystallizers in parallel operation under the same temperature and pressure conditions during the crystallization phase and thus the supersaturation is synchronized in all crystallization stages, the continuous evaporation is performed under vacuum and the evaporation heat required for this process is withdrawn from the suspension volume that cools down correspondingly, the evaporation heat is led to the suspension volume before the crystallization phase, the heating phase and the evaporation phase (crystallization phase) are executed alternatively for all crystallizers in parallel operation until the required stage yield is obtained, all transports between the crystallizers for realizing the countercurrent of mother liquor and crystallization product are performed in a sequential manner according to a determinable scheme and only clear solutions are transported, said transports are preferably carried out by automated process controllers with low operating efforts (generation of pressure differences by vacuum and/or inert gas, switching of valves or switching of pumps), the mother liquor and the crystallization product are separated within the crystallizer, the process function of the crystallization phase of a stage preferentially starts at the boiling point under normal pressure and ends at the boiling point at almost room temperature under appropriate vacuum, the process function is carried out in the same way and synchronously for all crystallizers as a time-controlled vacuum in a defined time slot, a grain coarsening and an improvement of the depletion effect is achieved by the alternating sequence of heating and cooling phases (temperature oscillation profile) within one crystallization stage because only the fine grain proportion is separated in the heating phases and is crystallized on the coarse crystals in the cooling phases, and this on the condition that a new germ formation is avoided by the targeted control of the supersaturation by means of vacuum profile and the crystal growth is sufficiently slowed down for a good depletion of the impurities, this is provided by a process function that is maximally adjusted to the solubility curve and the crystallization properties of the substance (in literature called process control in the metastabile zone), all crystallizers distil in a common distillate collector from which the distillate is re-distributed to the crystallizers for the subsequent separation phase, and the filling of the crystallizers with fresh solvent from the distillate recipient is performed in a level-controlled manner and the nominal values of the filling level are determined in the individual reactors according to the desired yield and the solubility function.

BRIEF DESCRIPTION OF THE DRAWINGS

In the following the invention is explained by the embodiments represented in the figures without being confined to them.

They show.

DETAILED DESCRIPTION OF THE INVENTION (Operating the Arrangement with Mobile Crystallization Product Phase)

Figure 1:
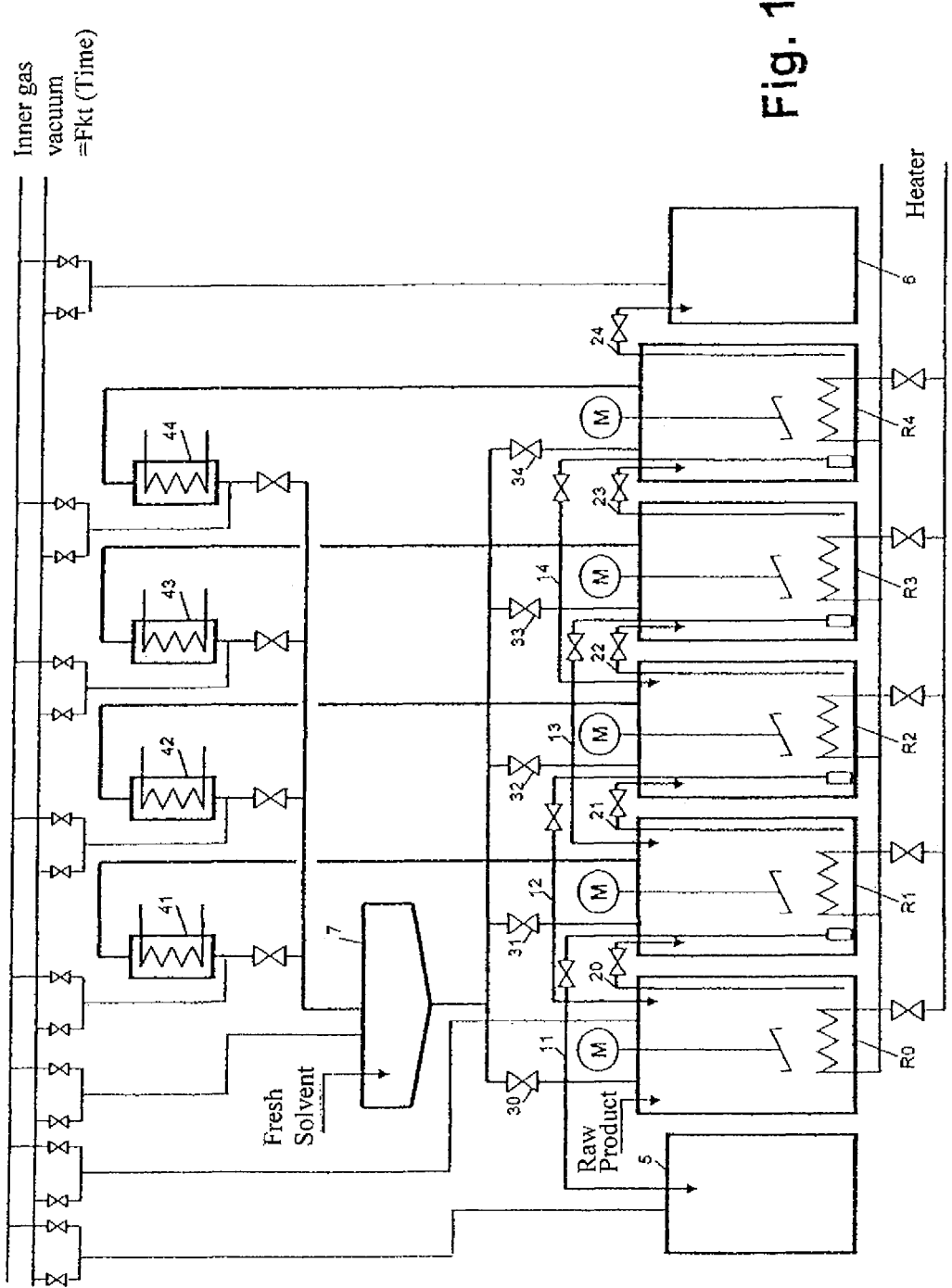
FIG. 1 which shows a schematic representation of an embodiment for the inventive arrangement for producing high-purity crystals, and FIG. 2 which shows a schematic representation of a further embodiment for the inventive arrangement for producing high-purity crystals.

As illustrated in FIG. 1, the arrangement for producing high-purity crystals comprises a plurality of crystallizers (R0 to Rn, with n being an integer and ≥2), n mother liquor lines (11 to 1n) each of which has a shut-off valve, n+1 crystallization product lines (20 to 2n) each of which has a shut-off valve, n+1 shut-off valves (30 to 3n) for dosing the solvent, n capacitors (41 to 4n) and a storage vessel (5) for waste, a storage vessel (6) for the pure product and a storage vessel (7) for distillates or fresh solvents, wherein the crystallizers Rn and Rn−2 are connected with each other via the mother liquor line 1n and the crystallizers Rn and Rn+1 are connected with each other via the crystallization line 2n.

The mother liquor line 11 leads from crystallizer R1 to the storage vessel (5) for waste, the crystallization line 2n leads from the crystallizer Rn to the storage vessel (6) for the pure product.

Due to this arrangement a mother liquor flow can be generated which is directed from a crystallizer to the second-next crystallizer in the direction of decreasing purity, and a crystallization product flow can be generated which is directed from a dissolved crystallization product that is about to crystallize to the next crystallizer in the direction of higher purity.

In this arrangement the mother liquor and the crystallization product are guidable to each other batch-by batch in the individual crystallization phases and a number of crystallizers (R0 to Rn) is used, depending on the desired purity of the crystallization product.

In all crystallizers of the inventive arrangement the mother liquor lines are preferentially equipped with a filtration element for separating the mother liquor as completely as possible and said lines are provided with shut-off valves that are preferably controlled by an electrical or pneumatic system.

Advantageously, all crystallizers (R0 to Rn) are associated to a common vacuum source and a common vacuum controller as well as to an inert gas source.

Usefully, all crystallizers are supplied in parallel from a common heating to source and each crystallizer is equipped with a system that controls the inside temperature during the heating phase.

A condenser and a common distillate recipient are preferably associated to each crystallizer (R1 to Rn) and from said condenser fresh solvent is distributed to each of the crystallizers.

Advantageously, all crystallizers (R0 to Rn) are equipped with a filling level controller and shut-off valves (30 to 3n) in the supply line of the fresh solvent.

The inventive arrangement is operated so that the crystallization product and the mother liquor are led to each other batch by batch in countercurrent in the individual crystallization stages and after the crystallization, starting with the crystallization stage of the lowest purity, the mother liquor is separated from the crystallization product within the crystallizer, said mother liquor is transported to the second-next crystallization stage in the direction of decreasing purity whereas the crystallization product remains in the crystallization stage and the mother liquor of the second-next crystallization stage of higher purity and/or fresh solvent are/is added there, separated and then, starting with the crystallization stage of the highest purity, transported to the next crystallization stage in the direction of higher purity, and there it is subject to crystallization simultaneously with all the other crystallization stages.

Advantageously, the same amount of solvent, related to the quantity used, is continuously evaporated under the same temperature and pressure conditions in the individual crystallization stages during the crystallization in parallel operation and the supersaturation and yields are synchronized in all crystallization stages.

In this process a continuous evaporation under vacuum is preferentially carried out. The required evaporation heat is withdrawn from the suspension volume that cools down correspondingly.

According to the invention said vacuum is provided identically and synchronously as a time-controlled vacuum function in a defined time slot for all crystallizers with said vacuum function being time-controlled in such a way that after the primary germ formation the further crystallization is caused by crystal growth and a new germ formation is inhibited.

The vacuum function of the crystallization phase of one stage advantageously starts at the boiling point under normal pressure and preferentially ends at the boiling point at almost room temperature under appropriate vacuum.

In the inventive method the evaporation heat is supplied to the suspension volume in a heating phase before the evaporation phase (crystallization phase) and the heating phase and evaporation phase (crystallization phase) are continued until the required stage yield is obtained.

According to the invention a lot of crystallization stages are operated in parallel by means of the crystallizers (R1 to Rn) until the required purity of the crystallization products is attained.

In the embodiment of the inventive arrangement shown in FIG. 1 a defined purity level is assigned to each crystallizer, e.g. purity level 1 to the crystallizer R1. The crystallizers are connected by the mother liquor lines from the crystallizer Rn to crystallizer Rn−2 for the mother liquor transport. After each crystallization, the crystallization product is transported via the crystallization line from the degree of lower purity in the direction of higher purity.

(Operating the Arrangement with Stationary Crystallization Product Phase)

Figure 2:
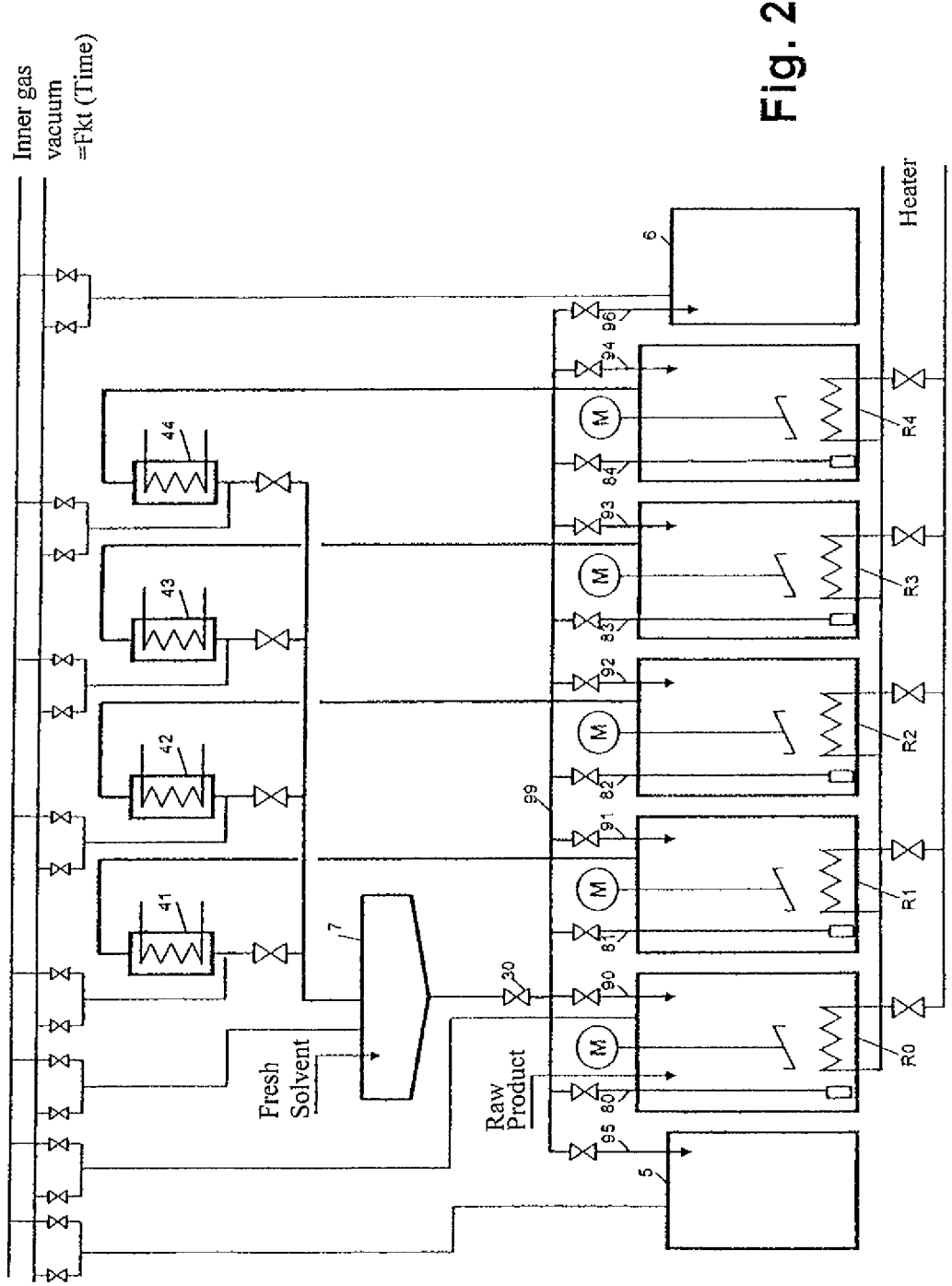

In a further possible embodiment for operating the inventive arrangement according to FIG. 2 the crystallization product remains stationary in a particular crystallizer during running through the multiple-stage purification process or purity level 1 . . . 4.

With respect to the purity levels, the transport of the mother liquor is carried out analogous to the scheme of the first embodiment (countercurrent guidance of purity level n to purity level n−2). As the crystallizers contain other purity levels after each crystallization stage, the connection for the mother liquor transport must be appropriately flexible. Like in FIG. 1, R0 is used as a solvent vessel for the raw product and the mother liquor of purity level 2. The supply of the solution from R0 is performed to the corresponding crystallizer with the purity level 1. It changes after each crystallization stage. If the highest purity level is reached in a crystallizer, the purification cycle starts anew in this crystallizer after the discharge of the crystallization product and with the supply of the raw product and mother liquor of degree 2 as solution. In terms of process conditions the crystallization stages follow the same inventive method in all crystallizers synchronous in time.

(Operating the Arrangement for Separating Mixtures)

A further embodiment of the invention is a combination of two arrangements according to FIG. 1 or FIG. 2 for a purification and a recovery section. By means of these arrangements it is possible to completely separate non-eutectic compositions or to carry out the separation up to the theoretically possible degree. The raw product is supplied on the purification stage that corresponds to its impurity level. All crystallization stages with a higher purity level are assigned to the purification section and all stages with a lower purity level are assigned to the recovery section.

In certain circumstances it may be useful to increase the purification or depletion effect by recovering the purified crystallization product or the mother liquor at the corresponding ends of the purification chain.

The advantage of the inventive multiple-stage crystallization technology of the present invention is that the kinetic factor of the mass transfer is reliably controllable, i.e. the supersaturation and the grain growth are influenced so that not only a rough, well separable crystallization product is produced but also a maximum reproducible depletion of the impurities is achieved.

Thanks to the inventive method and the inventive arrangement the critical parameters that influence supersaturation and grain growth are controllable in multiple crystallization stages in the same way and synchronously in time so that the reproducibility of the purification effect, which is of utmost importance for the quality assurance and the validation of the production process of pharmaceutical agents, is ensured.

All elements presented in the description, the subsequent claims and in the drawings can be essential for the invention both as single elements and in any combination.

The invention claimed is:

1. An apparatus for producing high-purity crystals, comprising:
    a plurality of crystallizers;
    a plurality of crystallization product lines, each having a shut-off valve;
    a plurality of mother liquor lines, each having a shut-off valve;
    a storage vessel for waste;
    a storage vessel for pure product;
    a storage vessel for fresh solvent or distillate, the storage vessel for fresh solvent or distillate in connection with a plurality of supply lines, each of the supply lines having a shut off valve, each of the supply lines feeding one of the crystallizers;
    a plurality of condensers;
    the mother liquor lines connecting one of the crystallizers from among the plurality of crystallizers with one of a next-adjacent crystallizer from among the plurality of crystallizers and the storage vessel for waste;
    the number of mother liquor lines in the plurality of mother liquor lines being sufficient to connect one of the crystallizers from among the plurality of crystallizers with one of a next-adjacent crystallizer from among the plurality of crystallizers and the storage vessel for waste;
    the crystallization product lines connecting one of the crystallizers from among the plurality of crystallizers with one of an adjacent crystallizer from among the plurality of crystallizers and the storage vessel for pure product;
    the number of crystallization product lines in the plurality of crystallization product lines being sufficient to connect one of the crystallizers from among the plurality of crystallizers with one of an adjacent crystallizer from among the plurality of crystallizers and the storage vessel for pure product;

whereby flow through a path formed by the mother liquor lines is countercurrent to flow through a path formed by the crystallization product lines, with flow through the plurality of mother liquor lines decreasing in purity and flow through the crystallization product lines increasing in purity.

2. An apparatus for producing high-purity crystals, comprising:

a plurality of crystallizers; a plurality of condensers; a storage vessel for waste;

a storage vessel for pure product;

a storage vessel for distillate or fresh solvent;

a central transport line in connection with the storage vessel for distillate or fresh solvent, the plurality of crystallizers, the storage vessel for waste and the storage vessel for pure product;

wherein each of the plurality of crystallizers, the storage vessel for waste and the storage vessel for pure product have a supply line having a shut off valve in connection with the central transport line, each of the plurality of crystallizers have a suction line having a shut off valve in connection with the central transport line, and the storage vessel for distillate or fresh solvent has a supply line having a shut off valve in connection with the central transport line, the suction lines being inside the crystallizers;

a plurality of condensers in connection with the storage vessel for distillate or fresh solvent, whereby a flow of a mother liquor is generated in the apparatus from a crystallizer having a purity designated as x into a next-adjacent crystallizer in a direction of decreasing purity, the next-adjacent crystallizer having a purity designated as x-2.

3. The apparatus for producing high-purity crystals in accordance with claim 1, wherein the mother liquor lines are provided with a filtration element for the separation of mother liquor.

4. The apparatus for producing high-purity crystals in accordance with claim 1 or 2, wherein each of the crystallizers in the plurality of crystallizers, the storage vessel for waste, the storage vessel for fresh solvent or distillate, and the storage vessel for pure product are in connection with an inert gas source and a common vacuum source controlled by a common vacuum controller.

5. The apparatus for producing high-purity crystals in accordance with claim 1 or 2, wherein each of the crystallizers in the plurality of crystallizers is heated in parallel by a common heating source and each of the crystallizers in the plurality of crystallizers is equipped with a control system for controlling internal temperature during the heating phase.

6. The apparatus for producing high-purity crystals in accordance with claim 1 or 2, wherein each of the crystallizers in the plurality of crystallizers is provided with a condenser from among the plurality of condensers with a common distillate recipient from which fresh solvent can be distributed to each of the crystallizers.

7. The apparatus for producing high-purity crystals in accordance with claim 1 or 2, wherein each of the crystallizers in the plurality of crystallizers is equipped with a filling level control and a switching valve in each of the supply lines for fresh solvent.

8. The apparatus for producing high-purity crystals in accordance with claim 2, wherein the shut off valves of the supply lines of the crystallizers are shut, whereby solutions and solvents can be charged via the suction lines in the crystallizers.

9. A method for producing high-purity crystals employing the apparatus of claim 1, in which the crystallization product and mother liquor flow countercurrent to each other batch by batch in individual crystallization stages represented by each crystallizer in the plurality of crystallizers, whereby after forming crystallization product, starting with the crystallization stage of lowest purity, mother liquor is separated from the crystallization product within the crystallizer, said mother liquor being transported to the next-adjacent crystallization stage in the direction of decreasing purity or to the storage vessel for waste, the crystallization product remaining in the crystallization stage after completing the separation of the mother liquor, fresh solvent is added to the crystallization stage, whereby the crystallization product is dissolved, and starting with the crystallization stage of highest purity, the dissolved crystallization product is transported to the next crystallization stage in the direction of highest purity or to the storage vessel for pure product, with crystallization taking place simultaneously in all crystallization stages.

10. A method for producing high-purity crystals employing the apparatus of claim 2, in which the crystallization product and mother liquor flow countercurrent to each other batch by batch in individual crystallization stages represented by each crystallizer in the plurality of crystallizers, whereby after forming crystallization product, starting with the crystallization stage of lowest purity, mother liquor is separated from the crystallization product within the crystallizer, said mother liquor being transported to the next-adjacent crystallization stage in the direction of decreasing purity or to the storage vessel for waste, whereas the crystallization product remaining in the crystallization stage after completing the separation of the mother liquor, fresh solvent is added to the crystallization stage, whereby the crystallization product is dissolved and the dissolved crystallization product is transported to the next crystallization stage in the direction of highest purity or to the storage vessel for pure product, with crystallization taking place simultaneously in all crystallization stages.

11. The method for producing high-purity crystals in accordance with claim 9 or 10, wherein during the simultaneous crystallization the same amount of solvent, related to the quantity used, is continuously evaporated under the same temperature and pressure conditions in the individual crystallization stages.

12. The method for producing high-purity crystals in accordance with claim 9 or 10, wherein supersaturations and yields are synchronized in the individual crystallization stages.

13. The method for producing high-purity crystals in accordance with claim 9 or 10, wherein a continuous evaporation is performed under a vacuum and the evaporation heat required for the continuous evaporation is withdrawn from the suspension volume that cools down correspondingly.

14. The method for producing high-purity crystals in accordance with claim 9 or 10, wherein a vacuum for the crystallizers is provided in a similar and synchronous manner as a time-controlled vacuum function in a defined time period.

15. The method for producing high-purity crystals in accordance with claim 14, wherein the vacuum function is time-controlled in such a way that after a primary nucleation, subsequent crystallization is caused by crystal growth and new nucleation is inhibited.

16. The method for producing high-purity crystals in accordance with claim 14, wherein the vacuum function of the crystallization in a stage starts at the boiling point under normal pressure and ends at the boiling point at almost room temperature under vacuum.

17. The method for producing high-purity crystals in accordance with claim 9 or 10, wherein the evaporation heat is supplied to a suspension volume in a heating phase before the crystallization phase.

18. The method for producing high-purity crystals in accordance with claim 9 or 10, wherein heating step alternates with the crystallization step until the required stage yield is obtained.

19. The method for producing high-purity crystals in accordance with claim 9 or 10, wherein the plurality of crystallization stages in the crystallizers are operated in parallel until the required purity is attained in the crystallization product, the number of crystallization stages being sufficient to attain the required purity.

20. A method for separating material mixtures employing two apparatuses according to claim 1 or 2 whereby at least one of the apparatuses is operated as a purification section and the other of the apparatuses is used as a recovery section and the raw product is supplied in a stage that corresponds to its impurity level.

21. The apparatus for producing high-purity crystals in accordance with claim 2, wherein at least one of the suction lines provided in the at least one of the crystallizers has a filtration element for the separation of mother liquor.

* * * * *